United States Patent
Fotopoulos

(10) Patent No.: US 10,705,653 B2
(45) Date of Patent: Jul. 7, 2020

(54) PROVIDING GROUND TRUTH FOR TOUCH SENSING WITH IN-DISPLAY FINGERPRINT SENSOR

(71) Applicant: Synaptics Incorporated, San Jose, CA (US)

(72) Inventor: Nickolas Fotopoulos, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 232 days.

(21) Appl. No.: 15/435,218

(22) Filed: Feb. 16, 2017

(65) Prior Publication Data

US 2018/0232101 A1    Aug. 16, 2018

(51) Int. Cl.
*G06F 3/041* (2006.01)
*G06F 3/044* (2006.01)
*G06K 9/00* (2006.01)
*G06F 3/042* (2006.01)

(52) U.S. Cl.
CPC ............ *G06F 3/0418* (2013.01); *G06F 3/042* (2013.01); *G06F 3/044* (2013.01); *G06K 9/0002* (2013.01); *G06F 2203/04106* (2013.01)

(58) Field of Classification Search
CPC ........ G06F 3/042; G06F 3/044; G06F 3/0418; G06F 2203/04106; G06K 9/0002
USPC ......................................................... 345/174
See application file for complete search history.

(56) References Cited

U.S. PATENT DOCUMENTS

| | | | | |
|---|---|---|---|---|
| 2010/0245289 A1* | 9/2010 | Svajda | .................. | G06F 3/0421 345/175 |
| 2015/0331508 A1* | 11/2015 | Nho | ...................... | G06F 3/0421 345/173 |
| 2016/0253041 A1* | 9/2016 | Park | ...................... | G06F 3/0418 345/174 |
| 2017/0108992 A1* | 4/2017 | Lee | ....................... | G06F 3/0414 |

* cited by examiner

*Primary Examiner* — Mark Edwards
(74) *Attorney, Agent, or Firm* — Paradice & Li LLP

(57) ABSTRACT

An input device includes a plurality of sensor electrodes and a processing system. The plurality of sensor electrodes is configured for capacitive sensing in a sensing region of the input device. The processing system is configured to receive first sensor information about the sensing region from the plurality of sensor electrodes, and to receive second sensor information about the sensing region from an auxiliary sensing device coupled to the sensing region. The processing system is further configured to dynamically calibrate the plurality of sensor electrodes based at least in part on the first sensor information and the second sensor information. In some aspects, the auxiliary sensing device may comprise one or more optical sensors.

20 Claims, 8 Drawing Sheets

PROVIDING GROUND TRUTH FOR TOUCH SENSING WITH IN-DISPLAY FINGERPRINT SENSOR

TECHNICAL FIELD

The present embodiments relate generally to capacitive sensing, and specifically to providing ground truth for capacitive sensors.

BACKGROUND OF RELATED ART

Input devices including proximity sensor devices (also commonly referred to as touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Proximity sensors may operate by detecting changes in an electric field and/or capacitance in the sensing region. In order to detect such changes, the proximity sensors may first determine a "baseline" (e.g., indicating a state of the electric field when no input object is expected to be present) for one or more portions of the sensing region. However, establishing an incorrect baseline may cause the proximity sensors to report "ghost" touches (e.g., false positives) and/or fail to report intentional touches (e.g., false negatives). Many factors may contribute to an incorrect baseline estimate including, for example, an object in contact with the sensing region at device power-up and/or temperature changes. Thus, it is desirable to provide ground truth for the proximity sensors to prevent and/or correct for incorrect baseline estimates.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method of dynamically calibrating an input device configured for capacitive sensing is disclosed. The input device includes a processing system and a number of sensor electrodes configured for capacitive sensing in a sensing region of the input device. The processing system is configured to receive first sensor information about the sensing region from the plurality of sensor electrodes, and to receive second sensor information about the sensing region from an auxiliary sensing device coupled to the sensing region. The processing system is further configured to dynamically calibrate the plurality of sensor electrodes based at least in part on the first sensor information and the second sensor information.

The auxiliary sensing device may include one or more optical sensors. In some aspects, the one or more optical sensors may be operable in a first mode and a second mode. For example, the one or more optical sensors may be configured for fingerprint scanning when operating the first mode. The processing system may operate the plurality of optical sensors in the second mode when acquiring the second sensor information. In some aspects, the one or more optical sensors may be configured for lower-resolution imaging when operating in the second mode compared to the first mode. In some other aspects, the processing system may be configured to request the second sensor information from the auxiliary sensing device if the first sensor information indicates an error condition.

In some aspects, the processing system may detect an input in the sensing region based on the first sensor information and determine, based on the second sensor information, whether an object is in contact with the sensing region. The processing system may then selectively validate the detected input based on the determination. For example, the detected input may be validated if the second sensor information indicates that an object is in contact with the sensing region. However, if the second sensor information indicates that no object is in contact with the sensing region, the processing system may update a capacitive sensing baseline for the plurality of sensor electrodes.

In some aspects, the processing system may detect an input in the sensing region based on the first sensor information and determine, based on the second sensor information, position information for an object in contact with the sensing region. The processing system may then correlate the position information with the detected in put. For example, the processing system may estimate, based on the first sensor information, a position of the detected input in the sensing region. The processing system may then update the position estimate using the position information determined from the second sensor information.

BRIEF DESCRIPTION OF THE DRAWINGS

The present embodiments are illustrated by way of example and are not intended to be limited by the figures of the accompanying drawings.

DETAILED DESCRIPTION

Figure 1:
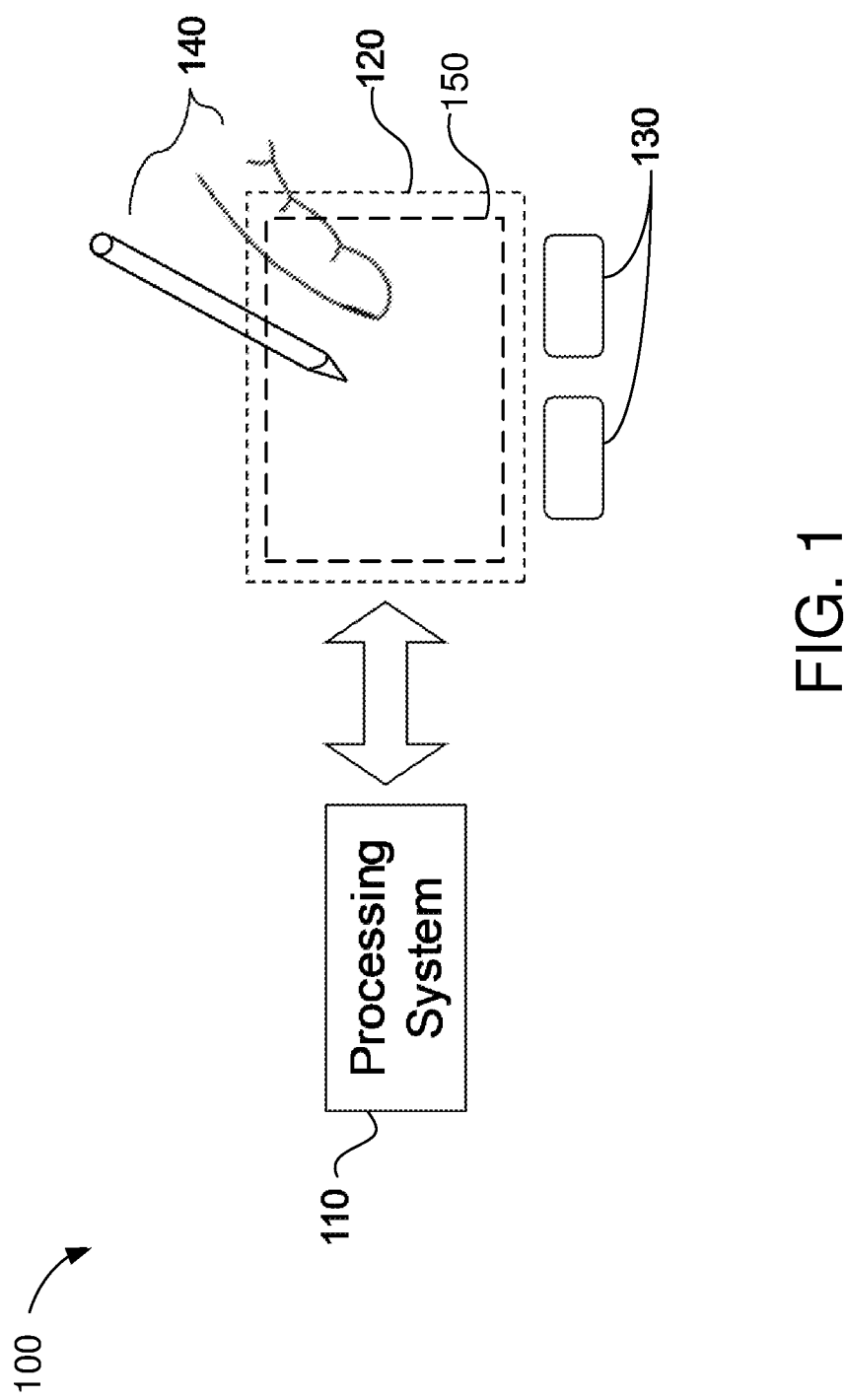
FIG. 1 shows an example input device within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

FIG. 1 shows an example input device 100 within which the present embodiments may be implemented. The input device 100 includes a processing system 110 and a sensing region 120. The input device 100 may be configured to provide input to an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Examples technologies may include Inter-Integrated Circuit (I²C), Serial Peripheral Interface (SPI), PS/2, Universal Serial bus (USB), Bluetooth®, Infrared Data Association (IrDA), and various radio frequency (RF) communication protocols defined by the IEEE 802.11 standard.

In the example of FIG. 1, the input device 100 may correspond to a proximity sensor device (e.g., also referred to as a "touchpad" or "touch sensor device") configured to sense input provided by one or more input objects 140 in the sensing region 120. Example input objects 140 include fingers, styli, and the like. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some embodiments, the sensing region 120 may extend from a surface of the input device 100 in one or more directions in space, for example, until a signal-to-noise ratio (SNR) of the sensors falls below a threshold suitable for object detection. For example, the distance to which the sensing region 120 extends in a particular direction may be on the order of less than a millimeter, millimeters, centimeters, or more, and may vary with the type of sensing technology used and/or accuracy desired. In some embodiments, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof.

In some embodiments, input surfaces may be provided by, and/or projected on, one or more surfaces of a housing of the input device 100 (e.g., as an image). For example, the sensing region 120 may have a rectangular shape when projected onto an input surface of the input device 100. In some aspects, inputs may be provided through images spanning one, two, three, or higher dimensional spaces in the sensing region 120. In some other aspects, inputs may be provided through projections along particular axes or planes in the sensing region 120. Still further, in some aspects, inputs may be provided through a combination of images and projections in the sensing region 120.

The input device 100 may utilize various sensing technologies to detect user input. Example sensing technologies may include capacitive, elastive, resistive, inductive, magnetic, acoustic, ultrasonic, and optical sensing technologies. In some embodiments, the input device 100 may include one or more sensing elements configured to implement the various sensing technologies.

In some embodiments, the input device 100 may utilize resistive sensing technologies to detect user inputs. For example, the sensing region 120 may be formed by a flexible and conductive layer separated, by one or more spacer elements, from a conductive second layer. The sensing region 120 may detect user input by creating one or more voltage gradients across the layers, and sensing when the first layer is brought in contact with the second layer. More specifically, pressing the flexible first layer may deflect it sufficiently to create electrical contact between the layers, resulting in voltage outputs reflective of the point(s) of contact between the layers. These voltage outputs may be used to determine positional information (e.g., indicating a position, in the sensing region 120) about the detected inputs.

In some other embodiments, the input device 100 may utilize inductive sensing technologies to detect user inputs. For example, the sensing region 120 may include one or more sensing elements configured to pick up loop currents induced by a resonating coil or pair of coils. The input device 100 may then detect user inputs based on a combination of the magnitude, phase, and/or frequency of the currents. The characteristics of the loop currents may further be used to determine positional information about the detect inputs.

Still further, in some embodiments, the input device 100 may utilize capacitive sensing technologies to detect user inputs. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may detected as "signals" indicative of user input. The sensor electrodes may be arranged in arrays or other configurations to detect inputs at multiple points within the sensing region 120. In some aspects, some sensor electrodes may be ohmically shorted together to form larger sensor electrodes. Some capacitive sensing technologies may utilize resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some embodiments, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance sensing methods detect changes in the capacitive coupling between sensor electrodes. For example, an input object near the sensor electrodes may alter the electric field between the sensor electrodes, thus changing the measure capacitive coupling of the sensor electrodes. In some embodiments, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes).

In some aspects, each sensor electrode may either be a dedicated transmitter or a dedicated receiver. In other aspects, each sensor electrode may be configured to transmit and receive.

The processing system 110 may be configured to operate the hardware of the input device 100 to detect input in the sensing region 120. In some embodiments, the processing system 110 may control one or more sensor electrodes to detect and/or identify objects in the sensing regions 120. For example, the processing system 110 may be configured to transmit signals via one or more transmitter sensor electrodes and receive signals via one or more receiver sensor electrodes. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 100 may be implemented as software executed by a central processing unit (CPU) of the computing device. In another example, the input device 100 may be physically integrated in a mobile device, and the processing system 110 may correspond, at least in part, to a CPU of the mobile device.

In some embodiments, the processing system 110 may be implemented as a set of modules that are implemented in firmware, software, or a combination thereof. Example modules include hardware operation modules for operating hardware such as sensor electrodes and display screens; data processing modules for processing data such as sensor signals and positional information; and reporting modules for reporting information. In some embodiments, the processing system 110 may include sensor operation modules configured to operate sensing elements to detect user input in the sensing region 120; identification modules configured to identify gestures such as mode changing gestures; and mode changing modules for changing operation modes of the input device 100 and/or electronic system.

The processing system 110 may respond to user input in the sensing region 120 by triggering one or more actions. Example actions include changing an operation mode of the input device 110 and/or graphical user interface (GUI) actions such as cursor movement, selection, menu navigation, and the like. In some embodiments, the processing system 110 may provide information about the detected input to the electronic system (e.g., to a CPU of the electronic system). The electronic system may then process information received from the processing system 110 to carry out additional actions (e.g., changing a mode of the electronic system and/or GUI actions).

The processing system 110 may operate the sensing elements of the input device 100 to produce electrical signals indicative of input (or lack of input) in the sensing region 120. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode.

In some embodiments, the processing system 110 may further determine positional information for a detected input, recognize handwriting, and the like. The term "positional information," as used herein, refers to any information describing or otherwise indicating a position or location of the detected input (e.g., within the sensing region 120). Example positional information may include absolute position, relative position, velocity, acceleration, and/or other types of spatial information. The term "zero-dimensional" positional information, as used herein, refers to any information describing a relative proximity of the detected input. Example zero-dimensional positional information may include how near or far an object is to the sensing region 120, or whether or not the object is contact with the sensing region 120.

The term "one-dimensional" positional information, as used herein, refers to information describing a position of the detected input along a particular axis. The term "two-dimensional" positional information, as used herein, refers to information describing a position of the detected input in a plane. The term "three-dimensional" positional information, as used herein, refers to information describing a position of the detected input in space. Further examples of positional information may include historical information, for example, indicating changes in position, movement, or instantaneous velocity of the detected input.

The input device 100 may include additional input components that can be operated by the processing system 110 or another processing system. In some aspects, the additional input components may provide redundant functionality for detecting input in the sensing region 120. For example, in some embodiments, the additional input components may include "auxiliary" sensor devices (not shown for simplicity) capable of detecting objects in (or proximate to) the sensing region 120 using other sensing technologies (such as cameras and/or optical sensors). In other aspects, the additional input components may provide additional functionality to complement the input detection capabilities of the sensing region 120. For example, in some embodiments, the additional input components may include buttons 130 that can be used to facilitate selection of items using the input device 100. Other types of additional input components may include sliders, balls, wheels, switches, and the like.

In some embodiments, the input device 100 may include a touch screen interface (e.g., display screen) that at least partially overlaps the sensing region 120. For example, the sensor electrodes of the input device 100 may form a substantially transparent overlay on the display screen, thereby providing a touch screen interface for the associated electronic system. The display screen may be any type of dynamic display capable of displaying a visual interface to a user. Examples of suitable display screen technologies may include light emitting diode (LED), organic LED (OLED), cathode ray tube (CRT), liquid crystal display (LCD), plasma, electroluminescence (EL), or other display technology.

In some embodiments, the input device 100 may share physical elements with the display screen. For example, one or more of the sensor electrodes may be used in displaying the interface and sensing inputs. More specifically, a sensor electrode used for sensing inputs may also operate as a display electrode used for displaying at least a portion of the interface. In some embodiments, the input device 100 may include a first sensor electrode configured for displaying at least part of the interface and sensing inputs, and a second sensor electrode may be configured for input sensing only. For example, the second sensor electrode may be disposed between substrates of the display device or may be external to the display device.

A display electrode may include one or more segments of a Vcom electrode (common electrodes), source drive lines (electrodes), gate lines (electrodes), an anode sub-pixel electrode or cathode pixel electrode, or any other display element. These display electrodes may be disposed on an appropriate display screen substrate. For example, the display electrodes may be disposed on a transparent substrate (such as a glass substrate, TFT glass, or any other transparent material) in a display screen (e.g., in plane switching (IPS), fringe field switching (FFS), plane to line switching (PLS), or OLED), on the bottom of the color filter glass of a display screen (e.g., patterned vertical alignment (PVA), multi-domain vertical alignment (MVA), IPS, or FPS), over a cathode layer (such as OLED), and the like. In such embodiments, the display electrode may be referred to as a "combination electrode," since it performs multiple functions. In some aspects, there exists a one-to-one relationship between a sensor electrode and a display electrode (corresponding to a particular pixel or sub-pixel of the display). In other aspects, two or more sensor electrodes may correspond to the same display electrode (or pixel).

In some aspects, the display screen may be controlled or operated, at least in part, by the processing system 110. The processing system 110 may be configured to execute instructions related to sensing inputs and displaying the interface. For example, the processing system 110 may drive a display electrode to display at least a portion of the interface and sensing user inputs, concurrently. In another example, the processing system 110 may drive a first display electrode to display at least a portion of the interface while concurrently driving a second display electrode to sense user inputs.

The processing system 110 may execute instructions related to sensing inputs and displaying the interface at different times (herein referred to as non-display update periods). In some aspects, the non-display update periods may occur between display line update periods of a common display frame, and may be at least as long as a display line update period. In other aspects, the non-display update periods may occur between display line update periods of a common display frame, and may be either longer or shorter than a display line update period. The non-display update periods may occur at the beginning of a display frame and/or between display frames. In some embodiments, the processing system 110 may be configured to drive one or more of the sensor electrodes and/or display electrodes with a shield signal. For example, the shield signal may be a constant voltage signal or a varying voltage signal (such as a guard signal). In some aspects, one or more of the sensor electrodes and/or display electrodes may be electrically floated.

As described above, the processing system 110 may detect user input in the sensing region 120 based on changes in an electric field (or capacitance level) provided by corresponding sensor electrodes. More specifically, the processing system 110 may continuously (or periodically) detect the capacitance of a sensor electrode and compare the detected capacitance against a baseline capacitance level (e.g., corresponding to a state of the sensor electrode when no input is detected). The processing system 110 may sense a user input in a given portion of the sensing region 120 if the capacitance detected across one or more sensor electrodes in the given portion differs from their respective baselines by a threshold amount. Therefore, establishing an incorrect baseline could cause the sensor electrodes to report "ghost" inputs (e.g., false positives) and/or fail to report intentional inputs (e.g., false negatives). There are many factors that may contribute to an incorrect baseline estimate including, for example, an object being in contact with the sensing region 120 at device power-up and/or temperature changes.

Aspects of the present disclosure may leverage one or more auxiliary sensors to determine ground truth for the sensor information received via the sensing region 120. For example, the auxiliary sensors may implement other (e.g., non-capacitive) sensing technologies to detect objects in, or proximate to, the sensing region 120. In some aspects, the auxiliary sensors may be configured to detect objects and/or inputs in an auxiliary sensing region 150 that coincides with, or substantially overlaps, the sensing region 120. In some embodiments, the auxiliary sensors may include one or more optical sensors (e.g., photodiodes, CMOS image sensor arrays, CCD arrays, and/or any other sensors capable of detecting wavelengths of light in the visible spectrum, the infrared spectrum, and/or the ultraviolent spectrum) configured to detect objects through imaging or detecting changes in optical patterns in the auxiliary sensing region 150. Thus, in some aspects, optical sensing information received via the auxiliary sensing region 150 may be used to verify and/or validate other capacitive sensing information received via the sensing region 120 (e.g., to filter out false-positive and/or false-negative inputs). In other aspects, the sensor information received via the auxiliary sensing region 150 may be used to supplement the sensor information received via the sensing region 120 (e.g., to detect inputs with a higher degree of accuracy and/or precision).

In some embodiments, the processing system 110 may use sensor information received via the auxiliary sensing region 150 to dynamically calibrate one or more components of the input device 100. The term "calibrate," as used herein, means to supplement and/or adjust one or more settings or parameters. For example, the processing system 110 may calibrate one or more components of the input device 100 by updating or resetting a baseline for one or more sensor electrodes, updating one or more force detection parameters associated with any permanent deformations in the sensing region 120, determining baseline shifts in detected images and/or profiles as a function of frequency, and implementing any other device configurations that could otherwise be performed at production test time (e.g., on an assembly line). In another example, the processing system 110 may use the sensor information received via the auxiliary sensing region 150 to supplement sensor information received via the sensing region 120 (e.g., to generate a higher-resolution sensor input or determine an improved position estimate for the detected input).

Figure 2:
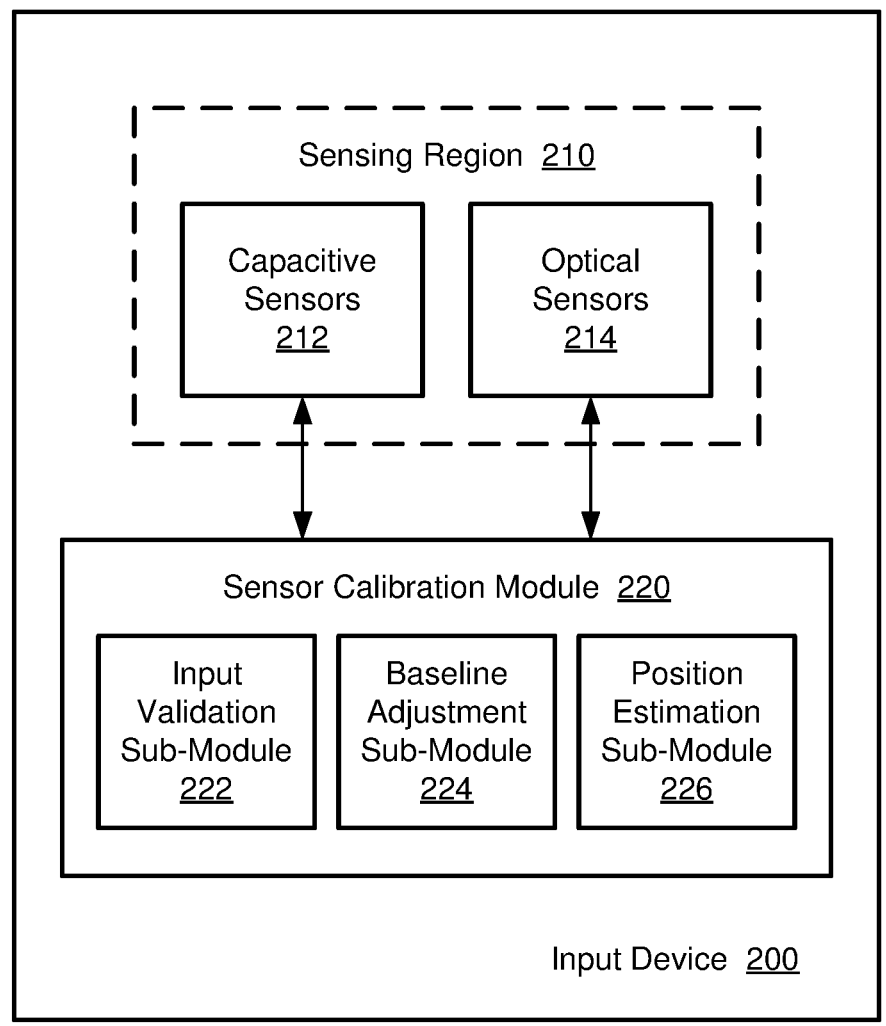
FIG. 2 is a block diagram of an input device capable of dynamic sensor calibration, in accordance with some embodiments.

FIG. 2 is a block diagram of an input device 200 capable of dynamic sensor calibration, in accordance with some embodiments. The input device 200 includes a sensing region 210 and sensor calibration module 220. The sensing region 210 may encompass any space above, around, in, and/or proximate to the input device 200 in which the input device 200 is able to detect user input, such as provided by one or more input objects (not shown for simplicity). The size, shape, and/or location of the sensing region 210 may vary depending on actual implementations.

In some embodiments, the sensing region 210 includes, or is otherwise coupled to, a set of capacitive sensors 212 and optical sensors 214. The capacitive sensors 212 may detect inputs in the sensing region 210 using capacitive sensing technologies (such as described above with respect to FIG.

1). For example, the capacitive sensors 212 may include an array of sensor electrodes that create an electric field in and/or around the sensing region 210. The input device 200 may detect inputs based on changes in capacitance of the sensor electrodes and/or the electric field. The optical sensors 214 may also be used to detect inputs and/or objects in the sensing region 210 through imaging or detecting changes in optical patterns in the sensing region 210. For example, the optical sensors 214 may include an array of active pixel sensors (e.g., photodiodes, CMOS image sensor arrays, CCD arrays, and/or any other sensors capable of detecting wavelengths of light in the visible spectrum, the infrared spectrum, and/or the ultraviolent spectrum) that are used for capturing high resolution images, such as required for fingerprint scanning.

The capacitive sensors 212 and optical sensors 214 are coupled to the sensor calibration module 220. The sensor calibration module 220 may be implemented by, or include at least a portion of, a processing system (such as processing system 110) that controls an operation of the capacitive sensors 212 and/or optical sensors 214. In some embodiments, the sensor calibration module 220 may perform one or more sensor calibration operations on the capacitive sensors 212 based on sensor information received via the optical sensors 214. For example, in some aspects, the sensor calibration module 220 may include an input validation sub-module 222, a baseline adjustment sub-module 224, and a position estimation sub-module 226. In other embodiments, the sensor calibration module 220 may perform one or more sensor calibration operations on the optical sensors 214 based on sensor information received via the capacitive sensors 212.

The input validation sub-module 222 may validate inputs detected by the capacitive sensors 212 based on sensor information received via the optical sensors 214. For example, in some instances, the capacitive sensors 212 may detect an input in the sensing region 210, but the processing system may be unsure of whether the detected input corresponds to an actual user input or a ghost touch (e.g., caused by noise, low ground mass conditions, or any other condition that could cause a "touch" input to be detected when an object is not present within the sensing region 210). Accordingly, in some embodiments, the input validation sub-module 222 may acquire optical sensing information from the optical sensors 214 to validate (or invalidate) the capacitive sensing information received from the capacitive sensors 212.

For example, the input validation sub-module 222 may trigger the optical sensors 214 to capture an image of the sensing region 210 (or at least a portion of the sensing region 210 where input is expected) to verify whether an object is present in the sensing region 210. If the input validation sub-module 222 determines, based on the optical sensing information, that an object is indeed present in the sensing region 210, the input validation sub-module 222 may indicate that the input detected by the capacitive sensors 212 is a valid user input (e.g., and may be processed further by the processing system). However, if the optical sensing information indicates that no object is present in the sensing region 210, the input validation sub-module 222 may indicate that the input detected by the capacitive sensors 212 is a ghost touch (e.g., and should be ignored by the processing system).

The baseline adjustment sub-module 224 may adjust a baseline of the capacitive sensors 212 based on sensor information received via the optical sensors 214. For example, in some instances, the processing system may be unsure of the baseline of one or more of the capacitive sensors 212 (e.g., at device startup, when an error condition is detected, or any time the processing system wishes to recalibrate the baseline of the capacitive sensors 212). Accordingly, in some embodiments, the baseline adjustment sub-module 224 may acquire optical sensing information from the optical sensors 214 to determine whether a current state of the capacitive sensors 212 may be representative of a baseline.

For example, the baseline adjustment sub-module 224 may trigger the optical sensors 214 to capture an image of the sensing region 210 (or at least a portion of the sensing region 210 for which a baseline is to be determined) to verify that no object is present in the sensing region 210. If the baseline adjustment sub-module 224 determines, based on the optical sensing information, that no object is present in the sensing region 210, the baseline adjustment sub-module 224 may update or reset the baseline estimates of the capacitive sensors 212 to reflect the current state of the capacitive sensors 212 (e.g., with no objects present). However, if the optical sensing information indicates that an object is present in the sensing region 210, the baseline adjustment sub-module 224 may adjust the baseline estimates for one or more of the capacitive sensors 212 to enable the capacitive sensors 212 to detect an input in the sensing region 210 coinciding with the object.

The position estimation sub-module 226 may improve upon a position estimate of inputs detected by the capacitive sensors 212 based on sensor information received via the optical sensors 214. The position estimate may include a location, size, shape, orientation, or any other property of the detected input. For example, in some instances, the point of contact between an input object (such as a stylus) may be finer than the resolution of the capacitive sensors 212. In such instances, it may be difficult for the processing system to precisely estimate the position of the input object based on the sensor information received from the capacitive sensors 212. However, the optical sensors 214 may detect objects in the sensing region 210 at a much higher resolution than the capacitive sensors 212. Thus, in some embodiments, the position estimation sub-module 226 may acquire optical sensing information from the optical sensors 214 to determine more precise and/or accurate position information for the input detected by the capacitive sensors 212.

For example, the position estimation sub-module 226 may trigger the optical sensors 214 to capture an image of the sensing region 210 (or at least a portion of the sensing region 210 coinciding with the detected input) to determine optical position information for an input object detected by the capacitive sensors 212. The position estimation sub-module 226 may then use the optical position information to supplement or update position estimates determined based on the capacitive sensing information received via the capacitive sensors 212. In some aspects, the position estimation sub-module 226 may use the optical position information to track or detect inputs in the sensing region 210 with a much finer granularity than would otherwise be possible based on the capacitive sensing information alone.

As described above, the optical sensors 214 may be used for capturing high resolution images (such as fingerprint scanning) in certain applications. However, the sensor calibration module 220 may not need to acquire optical sensing information at such high resolutions for certain sensor calibration applications (such as input validation or baseline adjustment). For example, the resolution needed to detect the presence of an object in the sensing region 210 (e.g., for sensor calibration) may be much lower than the resolution needed to detect individual ridges on the surface of a finger (e.g., for fingerprint scanning). Thus, for some embodiments, the sensor calibration module 220 may trigger the optical sensors 214 to operate in a lower resolution mode (e.g., to acquire relatively low resolution optical sensing information) when calibrating the capacitive sensors 212.

In some embodiments, the sensor calibration module 220 may acquire multiple sets of optical sensing information (e.g., corresponding to multiple images) from the optical sensors 214 when performing a sensor calibration operation. For example, capturing multiple images of the sensing region 210 may improve the confidence level of object detection in the sensing region 210. Thus, in some embodiments, the sensor calibration module 220 may proceed with calibrating the capacitive sensors 212 only when multiple sets of optical sensing information confirm the same state of the sensing region 210 (e.g., that an object is or is not present).

Still further, for some embodiments, the sensor calibration module 220 may activate the optical sensors 214 in an on-demand fashion (e.g., by triggering the optical sensors 214 to capture an image of the sensing region 210). For example, the sensor calibration module 220 may activate the optical sensors 214 when a sensor calibration event is triggered (such as when the processing system is unsure of an input detected by the capacitive sensors 212 and/or unsure of the baseline for one or more of the capacitive sensors 212). In other embodiments, the sensor calibration module 220 may leverage optical sensing information acquired by the optical sensors 214 for other applications. For example, when a user touches a finger to the sensing region 210, the capacitive sensors 212 may capture capacitive sensing information corresponding to a touch input and, at substantially the same time, the optical sensors 214 may capture optical sensing information corresponding to a fingerprint scan (e.g., to provide continuous authentication for the touch inputs). Accordingly, the sensor calibration module 220 may leverage the optical sensing information from the fingerprint scanning application to calibrate the capacitive sensors 212.

Figure 3:
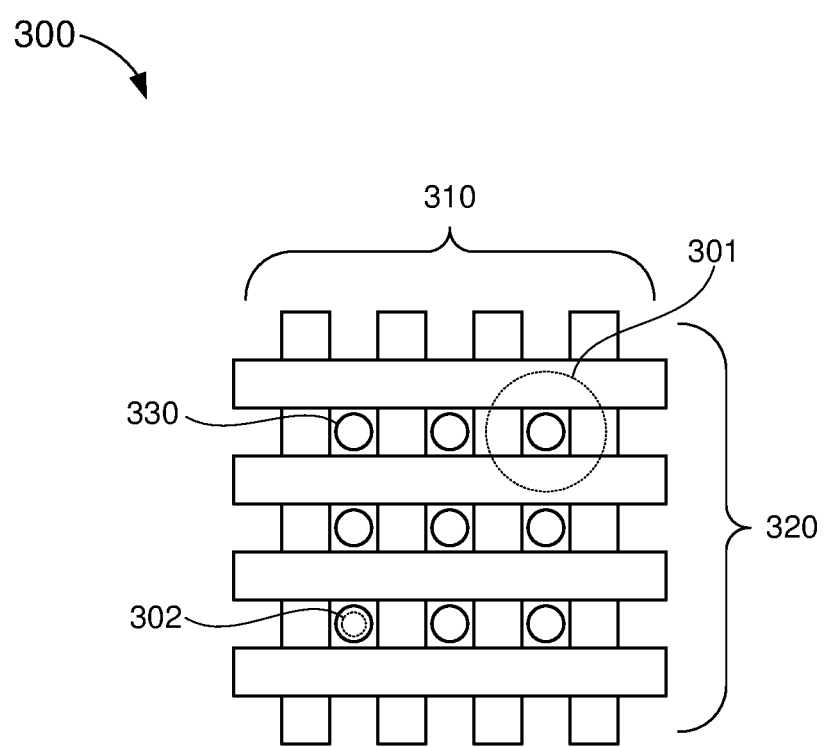
FIG. 3 shows an example sensor configuration that may provide at least part of the sensing region of an input device, in accordance with some embodiments.

FIG. 3 shows an example sensor configuration 300 that may provide at least part of the sensing region of an input device, in accordance with some embodiments. The sensor configuration 300 includes a capacitive sensor array formed by a number of sensor electrodes 310 arranged in a vertical pattern and a number of sensor electrodes 320 arranged in a horizontal pattern, and a number of optical sensing elements 330 provided between the sensor electrodes 310 and 320. In some embodiments, the sensor configuration 300 may represent at least a portion of the sensing region 210 of FIG. 2 and/or the sensing region 120 of FIG. 1. Accordingly, the sensor electrodes 310 and 320 may correspond to one or more of the capacitive sensors 212, and the optical sensing elements 330 may correspond to one or more of the optical sensors 214.

In some embodiments, the sensor electrodes 310 and 320 may be arranged on different sides of the same substrate. For example, the sensor electrodes 310 and 320 may be disposed on one surface of the substrate. In other embodiments, the sensor electrodes 310 and 320 may be arranged on different substrates. For example, the sensor electrodes 310 and 320 may be disposed on surfaces of different substrates that are adhered together. In another embodiment, the sensor electrodes 310 and 320 may be arranged on the same side or surface of a common substrate. For example, sensor electrodes 310 may include jumpers in regions where the sensor electrodes 310 cross over sensor electrodes 320 (such that the jumpers are insulated from the sensor electrodes 320).

In the example of FIG. 3, sensor electrodes 310 are shown to extend in a first (e.g., vertical) direction and sensor electrodes 320 are shown to extend in a second (e.g., horizontal) direction. Although the sensor electrodes 310 and 320 are depicted in a perpendicular grid arrangement, in actual implementations the sensor electrodes 310 and 320 may be arranged in other patterns. For example, in other embodiments, the sensor electrodes 310 may be parallel or diagonal to the sensor electrodes 320. Furthermore, each of the sensor electrodes 310 and 320 is shown to have substantially the same shape and size. However, in other embodiments, the sensor electrodes 310 and 320 may be of various shapes and/or sizes.

A processing system (not shown for simplicity) may "scan" the array of sensor electrodes 310 and 320 to detect inputs in the sensing region. In some embodiments, the sensor electrodes 310 and 320 may be configured to implement absolute capacitive sensing techniques. For example, the processing system may drive one or more of the sensor electrodes 310 and/or 320 with modulated signals to determine changes in the absolute capacitance of the sensor electrodes (e.g., absolute capacitive sensing). In other embodiments, the sensor electrodes 310 and 320 may be configured to implement transcapacitive sensing techniques. For example, the processing system may drive a transmitter signal on a first sensor electrode (e.g., of the sensor electrodes 310 or 320) and receive a resulting signal on a second sensor electrode (e.g., of the sensor electrodes 310 or 320).

A "capacitive pixel" may represent an area of localized capacitive coupling between sensor electrodes 310 and sensor electrodes 320. The capacitive coupling between sensor electrodes 310 and sensor electrodes 320 may change with a proximity and/or motion of input objects in the sensing region associated with the sensor electrodes 310 and 320. A capacitive pixel may also represent an area of localized capacitance between an input object and sensor electrodes 310 or sensor electrodes 320. Thus, the absolute capacitance of the sensor electrodes 310 and/or 320 may change with a proximity and/or motion of an input object in the sensing region.

A set of measurements across multiple capacitive pixels may form a "capacitive frame." For example, the capacitive frame may correspond to a "capacitive image" of the sensing region (e.g., representing a snapshot of the capacitive couplings at each of the capacitive pixels, at a given time). The processing system may capture multiple capacitive frames over multiple time periods to derive information about inputs in the sensing region. For example, successive capacitive frames acquired over successive periods of time may be used to track movements of one or more input objects entering, exiting, and/or within the sensing region.

As shown in FIG. 3, the array of sensor electrodes 310 and 320 may be well-suited for detecting input objects that have a relatively large footprint and/or overlap with one or more capacitive pixels. For example, a finger (or touch) input 301 may coincide or overlap with four capacitive pixels at the upper right corner of the sensor configuration 300. Thus, it is likely that at least one of the sensor electrodes 310 and/or 320 may generate a strong response signal (e.g., having a relatively high SNR) indicating the presence and/or position of the finger input 301 in the corresponding sensing region. However, it may be more difficult for the array of sensor electrodes 310 and 320 to detect input objects that have a relatively small footprint and/or do not overlap with any of the capacitive pixels. For example, a stylus (or passive pen)

input 302 may be provided in between the sensor electrodes 310 and 320, such that the stylus input 302 does not coincide or overlap with any capacitive pixels. As a result, none of the sensor electrodes 310 or 320 may generate a strong enough response signal to indicate the presence and/or position of the stylus input 302. Even if one or more of the sensor electrodes 310 and/or 320 could generate response signals with a sufficiently high SNR, such response signals may not accurately reflect the position of the stylus input 302 (e.g., since the stylus input 302 does not coincide with any of the sensor electrodes 310 or 320).

In some embodiments, the processing system may leverage sensor information from the optical sensing elements 330 to detect inputs (such as the stylus input 302) in the sensing region. In the example of FIG. 3, optical sensing elements 330 are disposed in the "gaps" between the sensor electrodes 310 and 320. The optical sensing elements 330 may operate by detecting light in the sensing region (e.g., sensing region 210). The detected light may be reflected from the input object, transmitting through the input object, emitted by the input object, or a combination thereof. The detected light may be in the visible or invisible spectrum (such as infrared or ultraviolet light). Example optical sensing elements include photodiodes, CMOS image sensors, CCD arrays, and any other sensors capable of detecting wavelengths of light in the visible spectrum, the infrared spectrum, and/or the ultraviolet spectrum. In some aspects, the sensing region may be actively illuminated such that the optical sensing elements 330 may detect the light reflected from input objects in the sensing region.

In some embodiments, the optical sensing elements 330 may generate a high resolution image of the sensing region (or at least a portion thereof). For example, the optical sensing elements 330 may be used in fingerprint scanning applications to capture images from which fine biometric details may be discerned (such as a pattern of ridges on the surface of a finger). Thus, the optical sensing elements 330 may detect objects in the sensing region with a much higher resolution than the sensor electrodes 310 and 320. The processing system may therefore use the optical sensing information received via the optical sensing elements 330 to determine more precise and/or accurate information about input objects in the sensing region.

As described above, the processing system may supplement capacitive sensing information received via the sensor electrodes 310 and 320 with optical sensing information received via the optical sensing elements 330. For example, the processing system may first receive capacitive sensing information, from the sensor electrodes 310 and 320, corresponding to an input (such as the stylus input 302) detected in the sensing region. Upon detecting the input, the processing system may then activate the optical sensing elements 330 to capture a high resolution image of the sensing region (or at least a portion of the sensing region coinciding with the detected input). The processing system may then determine position information for the detected input based on the high resolution image (e.g., location, size, shape, orientation, or any other property of the detected input). For some embodiments, the processing system may fold the high resolution position information into a running estimate of the position information for a detected input.

By combining sensor information from the sensor electrodes 310 and 320 and the optical sensing elements 330, the processing system may detect inputs in the sensing region with a much higher degree of precision and/or accuracy. For example, this may allow the processing system to detect and/or track relatively fine input objects (such as the stylus input 302) in the sensing region that may otherwise be undetectable using only the sensor electrodes 310 and 320.

Figure 4:
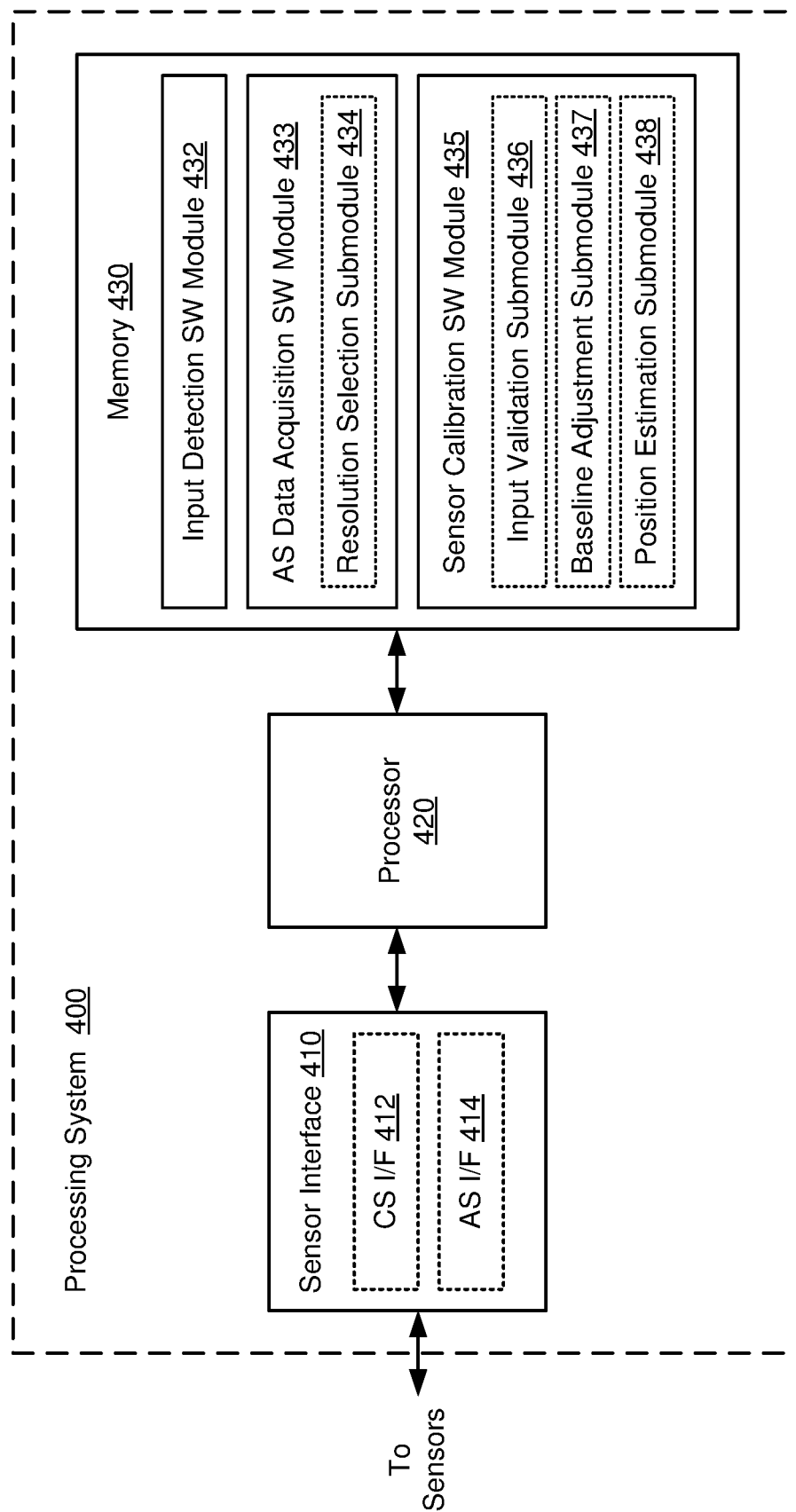
FIG. 4 is a block diagram of a processing system that may be used to calibrate the sensor electrodes of an input device, in accordance with some embodiments.

FIG. 4 is a block diagram of a processing system 400 that may be used to calibrate the sensor electrodes of an input device, in accordance with example embodiments. The processing system 400 may be an embodiment of the processing system 110 of FIG. 1 and/or the sensor calibration module 220 of FIG. 2. Thus, the processing system 400 may include a sensor interface 410, a processor 420, and a memory 430. For purposes of discussion herein, processor 420 is shown in FIG. 4 as being coupled between the sensor interface 410 and memory 430. For actual embodiments, the sensor interface 410, processor 420, and/or memory 430 may be connected together using one or more buses (not shown for simplicity).

The sensor interface 410 may include a capacitive sensor interface 412 and an auxiliary sensor interface 414. The capacitive sensor interface 412 may be used to communicate with one or more capacitive sensors of an input device (such as capacitive sensors 212 of FIG. 2). For example, the capacitive sensor interface 412 may transmit signals to, and receive signals from, one or more capacitive sensors to detect inputs in a sensing region of the input device. The auxiliary sensor interface 414 may be used to communicate with one or more auxiliary sensors of an input device (such as optical sensors 214 of FIG. 2). For example, the auxiliary sensor interface 414 may transmit activation signals to, and receive optical sensor information from, one or more optical sensors to capture an image of the sensing region of the input device.

Memory 430 may include a non-transitory computer-readable medium (e.g., one or more nonvolatile memory elements, such as EPROM, EEPROM, Flash memory, a hard drive, and so on) that may store at least the following software (SW) modules:
  an input detection SW module 432 to detect inputs in the sensing region of an input device based on capacitive sensing information received from one or more capacitive sensors (e.g., sensor electrodes);
  an auxiliary sensor (AS) data acquisition SW module 433 to acquire auxiliary sensing information from one or more auxiliary sensor devices (e.g., optical sensing elements) coupled to the sensing region, the AS data acquisition SW module including:
    a resolution selection submodule 434 to select a resolution for the sensor information to be captured by the auxiliary sensor devices; and
  a sensor calibration SW module 435 to dynamically calibrate the capacitive sensors based, at least in part, on the capacitive sensing information and the auxiliary sensing information, the sensor calibration SW module including:
    an input validation submodule 436 to validate inputs detected by the capacitive sensors based, at least in part, on the auxiliary sensing information;
    a baseline adjustment submodule 437 to adjust a baseline of the capacitive sensors based, at least in part, on the auxiliary sensing information; and
    a position estimation submodule 438 to determine supplemental position information for the detected inputs based, at least in part, on the auxiliary sensing information.

Each software module includes instructions that, when executed by processor 420, cause the processing system 400 to perform the corresponding functions. The non-transitory computer-readable medium of memory 430 thus includes instructions for performing all or a portion of the operations described below with respect to FIGS. 5-8.

Processor 420 may be any suitable one or more processors capable of executing scripts or instructions of one or more software programs stored in the processing system 400 (e.g., within memory 430). For example, processor 420 may execute the input detection SW module 432 to detect inputs in the sensing region of an input device based on capacitive sensing information received from one or more capacitive sensors. Processor 420 may also execute the AS data acquisition SW module 433 to acquire auxiliary sensing information from one or more auxiliary sensor devices coupled to the sensing region. In executing the AS data acquisition SW module 433, the processor 420 may further execute the resolution selection submodule 434 to select a resolution for the sensor information to be captured by the auxiliary sensor devices.

Still further, processor 420 may execute the sensor calibration SW module 435 to dynamically calibrate the capacitive sensors based, at least in part, on the capacitive sensing information and the auxiliary sensing information. In executing the sensor calibration SW module 435, the processor 420 may further execute the input validation submodule 436, the baseline adjustment submodule 437, and/or the position estimation submodule 438. For example, the processor 420 may execute the input validation submodule 436 to validate inputs detected by the capacitive sensors based, at least in part, on the auxiliary sensing information. The processor 430 may execute the baseline adjustment module 437 to adjust a baseline of the capacitive sensors based, at least in part, on the auxiliary sensing information. Further, the processor 438 may execute the position estimation submodule 438 to determine supplemental position information for the detected inputs based, at least in part, on the auxiliary sensing information.

Figure 5:
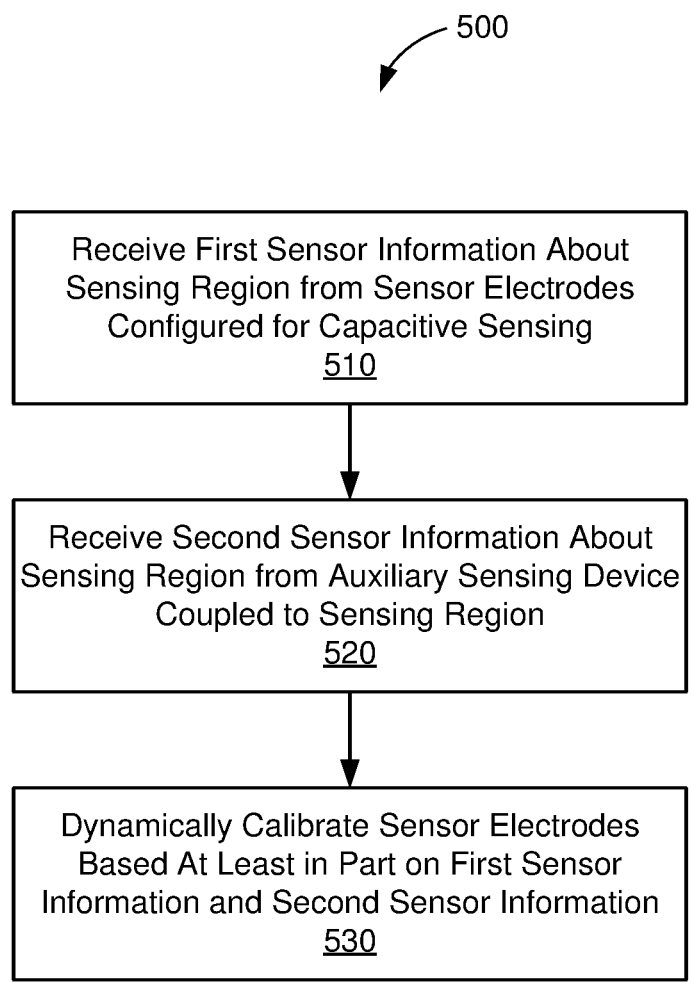
FIG. 5 is an illustrative flowchart depicting an example operation for calibrating the sensor electrodes of an input device based on auxiliary sensor information.

FIG. 5 is an illustrative flowchart depicting an example operation 500 for calibrating the sensor electrodes of an input device based on auxiliary sensor information. With reference, for example to FIG. 2, the operation 500 may be performed by the sensor calibration module 220 to dynamically calibrate the capacitive sensors 212 based, at least in part, on optical sensing information received from the optical sensors 214.

The sensor calibration module 220 may receive first sensor information about a sensing region of an input device from sensor electrodes configured for capacitive sensing (510). For example, the first sensor information may correspond to capacitive sensing information generated by the capacitive sensors 212. In some embodiments, the capacitive sensors 212 may generate the capacitive sensing information in response to changes in the capacitance of one or more sensor electrodes coupled to the sensing region 210. For example, the changes in capacitance may correspond to input objects detected in, or proximate to, the sensing region 210.

The sensor calibration module 220 may further receive second sensor information about the sensing region from an auxiliary sensing device coupled to the sensing region (520). For example, the second sensor information may correspond to optical sensing information generated by the optical sensors 214. In some embodiments, the optical sensors 214 may generate the optical sensing information in response to input objects detected in, or proximate to, the sensing region 210 (such as for fingerprint scanning applications). In other embodiments, the sensor calibration module 220 may activate or trigger the optical sensors 214 to acquire the optical sensing information in response to the detection of an input object by the capacitive sensors 212 and/or a sensor calibration event (e.g., at device startup, when an error condition is detected, or any time the processing system wishes to recalibrate the baseline of the capacitive sensors 212).

The sensor calibration module 220 may then dynamically calibrate the sensor electrodes based, at least in part, on the first sensor information and the second sensor information (530). In some embodiments, the sensor calibration module 220 may perform one or more sensor calibration operations on the capacitive sensors 212 based, at least in part, on the optical sensing information received via the optical sensors 214 (e.g., as described above with respect to FIG. 2). In some aspects, the sensor calibration module 220 may use the optical sensing information to validate inputs detected by the capacitive sensors 212. In other aspects, the sensor calibration module 220 may use the optical sensing information to adjust (e.g., update or reset) a baseline of the capacitive sensors 212. Still further, in some aspects, the sensor calibration module 220 may determine position information, based on the optical sensing information, to improve upon a position estimate of inputs detected by the capacitive sensors 212. In other embodiments, the sensor calibration module 220 may perform one or more sensor calibration operations on the optical sensors 214 based, at least in part, on the capacitive sensing information received via the capacitive sensors 212.

Figure 6:
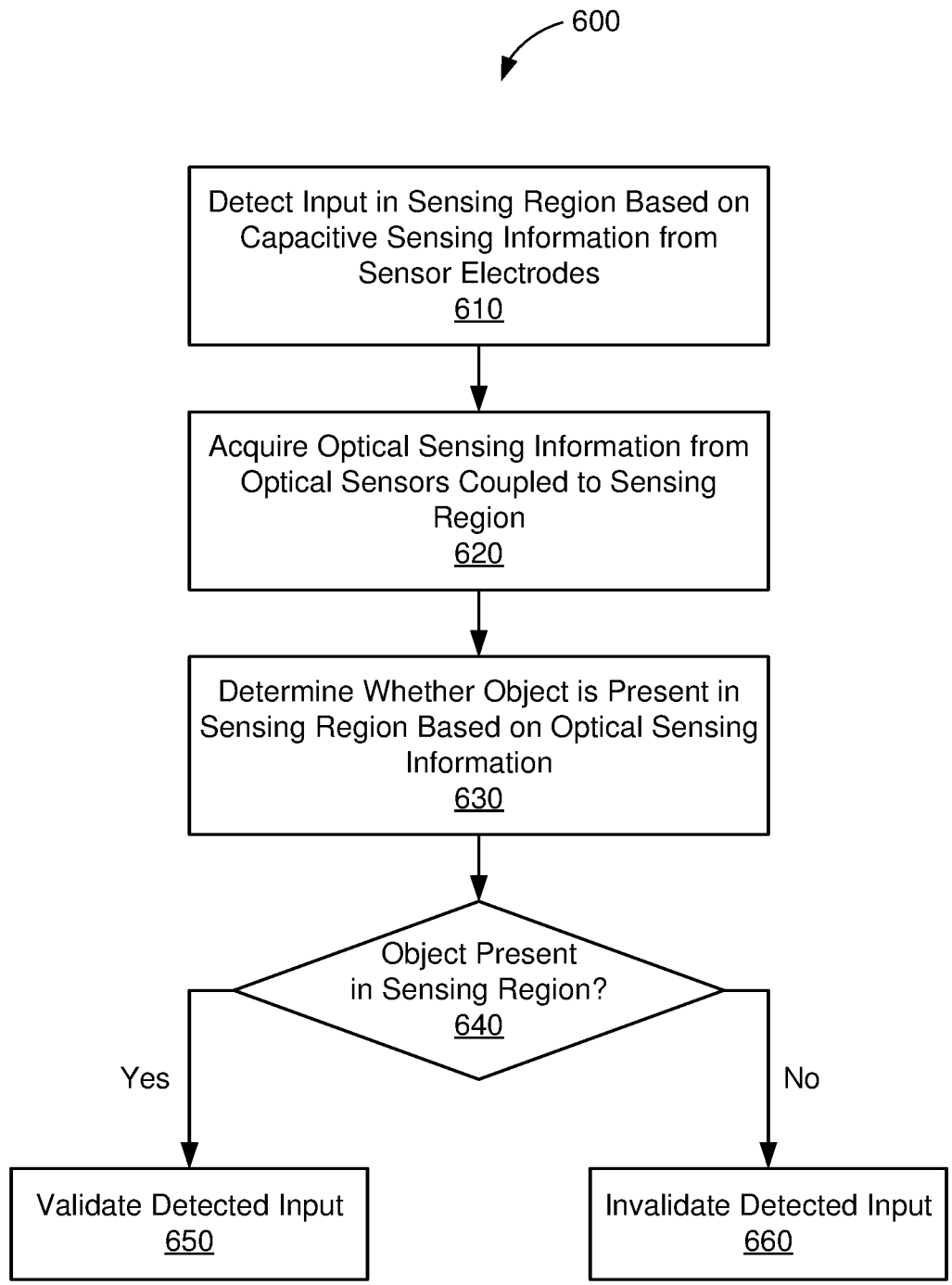
FIG. 6 is an illustrative flowchart depicting an example operation for validating inputs detected by one or more capacitive sensors based on optical sensing information.

FIG. 6 is an illustrative flowchart depicting an example operation 600 for validating inputs detected by one or more capacitive sensors based on optical sensing information. With reference, for example to FIG. 2, the operation 600 may be performed by the input validation sub-module 222 to validate inputs detected in the sensing region 210 by the capacitive sensors 212 based, at least in part, on optical sensing information received from the optical sensors 214.

The input validation sub-module 222 may detect an input in the sensing region of an input device based on capacitive sensing information received from one or more sensor electrodes (610). For example, the capacitive sensing information may reflect changes in the capacitance of one or more sensor electrodes coupled to the sensing region 210. The changes in capacitance may correspond to input objects detected in, or proximate to, the sensing region 210. In some embodiments, a processing system associated with the input device 200 may execute the input validation sub-module 222 when the capacitive sensors 212 detect an input in the sensing region 210, but the processing system is unsure of whether the detected input corresponds to an actual user input or a ghost touch.

The input validation sub-module 222 may further acquire optical sensing information from one or more optical sensors coupled to the sensing region (620). For example, the optical sensing information may correspond to an image of the sensing region 210 (or at least a portion of the sensing region 210 coinciding with the detected input). In some embodiments, the optical sensors 214 may generate the optical sensing information in response to input objects detected in, or proximate to, the sensing region 210 (such as for fingerprint scanning applications). In other embodiments, the input validation sub-module 222 may activate or trigger the optical sensors 214 to acquire the optical sensing information in response to the detection of an input object by the capacitive sensors 212 and/or a sensor calibration event.

The input validation sub-module 222 may then determine whether an object is present in the sensing region based, at least in part, on the optical sensing information (630). As described above, the optical sensing information may correspond to an image or scan of the sensing region 210 at substantially the same time the input is detected by the capacitive sensors 212. Thus, in some embodiments, the input validation sub-module 222 may use the optical sensing information to verify whether an object is indeed present in the sensing region 210 that could coincide with the detected input.

If the input validation sub-module 222 determines, based on the optical sensing information, that an object is present in the sensing region (640), the input validation sub-module 222 may proceed to validate the detected input (650). For example, if the input validation sub-module 222 determines that an object is indeed present in the sensing region 210, the input validation sub-module 222 may indicate that the input detected by the capacitive sensors 212 is a valid user input (e.g., and may be processed further by the processing system).

If the input validation sub-module 222 determines, based on the optical sensing information, that no object is present in the sensing region (640), the input validation sub-module 222 may invalidate the detected input (660). For example, if the input validation sub-module 222 determines that no object is present in the sensing region 210, the input validation sub-module 222 may indicate that the input detected by the capacitive sensors 212 is a ghost touch (e.g., and should be ignored by the processing system).

Figure 7:
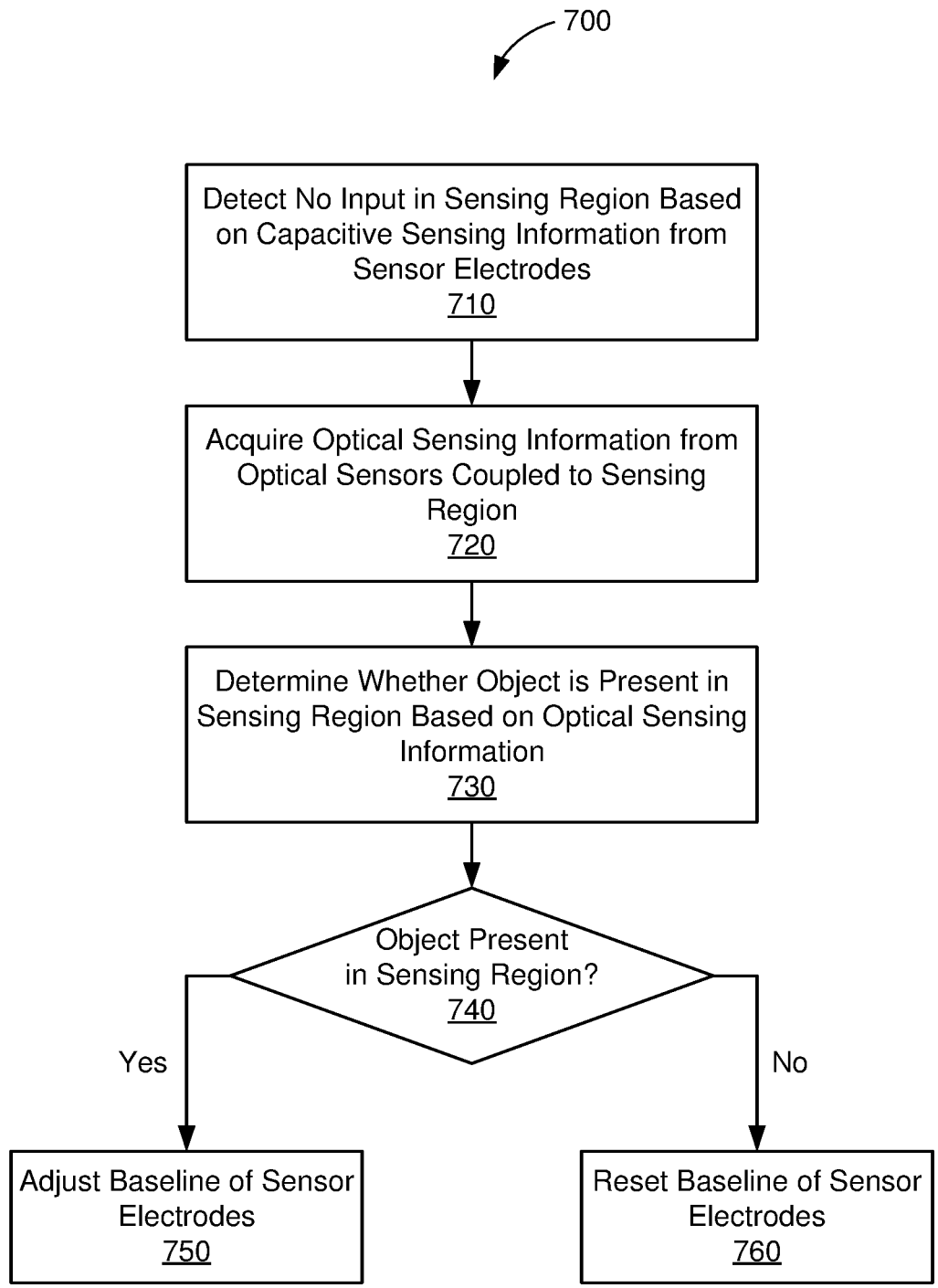
FIG. 7 is an illustrative flowchart depicting an example operation for adjusting a baseline of one or more capacitive sensors based on optical sensing information.

FIG. 7 is an illustrative flowchart depicting an example operation 700 for adjusting a baseline of one or more capacitive sensors based on optical sensing information. With reference, for example to FIG. 2, the operation 700 may be performed by the baseline adjustment sub-module 224 to adjust or rest a baseline of one or more of the capacitive sensors 212 based, at least in part, on optical sensing information received from the optical sensors 214.

The baseline adjustment sub-module 224 may determine that no input is detected in the sensing region based on capacitive sensing information received from one or more sensor electrodes (710). As described above, the presence of input objects in, or proximate to, the sensing region 210 may effect changes in the capacitance of one or more sensor electrodes coupled to the sensing region 210. Thus, the baseline adjustment sub-module 224 may determine that no input is detected in the sensing region 210 if each of the sensor electrodes remains at (or within a threshold of) a respective baseline capacitance level. In some embodiments, a processing system associated with the input device 200 may execute the baseline adjustment sub-module 224 when the processing system is unsure of the baseline of one or more of the capacitive sensors 212 (e.g., at device startup, when an error condition is detected, or any time the processing system wishes to recalibrate the baseline of the capacitive sensors 212).

The baseline adjustment sub-module 224 may further acquire optical sensing information from one or more optical sensors coupled to the sensing region (720). For example, the optical sensing information may correspond to an image of the sensing region 210 (or at least a portion of the sensing region 210 coinciding with the detected input). In some embodiments, the optical sensors 214 may generate the optical sensing information in response to input objects detected in, or proximate to, the sensing region 210 (such as for fingerprint scanning applications). In other embodiments, the baseline adjustment sub-module 224 may activate or trigger the optical sensors 214 to acquire the optical sensing information in response to a sensor calibration event.

The baseline adjustment sub-module 224 may then determine whether an object is present in the sensing region based, at least in part, on the optical sensing information (730). As described above, the optical sensing information may correspond to an image or scan of the sensing region 210 at a given instance in time. Thus, in some embodiments, the baseline adjustment sub-module 224 may use the optical sensing information to verify that no object is actually present in the sensing region 210 at a time when no input is detected by the capacitive sensors 212.

If the baseline adjustment sub-module 224 determines, based on the optical sensing information, that an object is present in the sensing region (740), the baseline adjustment sub-module 224 may adjust the baseline of one or more sensor electrodes (750). For example, if the baseline adjustment sub-module 224 determines that an object is actually present in the sensing region 210, the baseline adjustment sub-module 224 may adjust the baseline estimates for one or more of the capacitive sensors 212 to enable the capacitive sensors 212 to detect an input in the sensing region 210 coinciding with the object.

If the baseline adjustment sub-module 224 determines, based on the optical sensing information, that no object is present in the sensing region (740), the baseline adjustment sub-module 224 may proceed to reset or update the baseline of each of the sensor electrodes (760). For example, if the baseline adjustment sub-module 224 determines than no object is present in the sensing region 210, the baseline adjustment sub-module 224 may update or reset the baseline estimates of the capacitive sensors 212 to reflect the current state of the capacitive sensors 212 (e.g., with no objects present).

Figure 8:
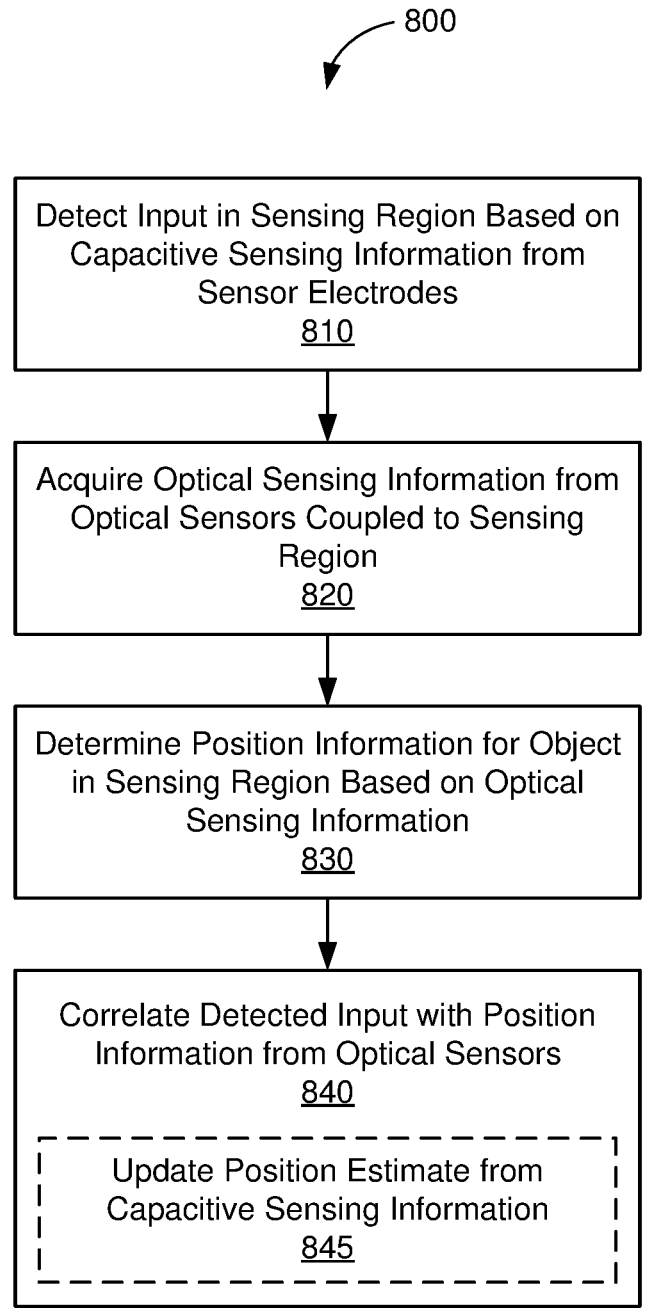
FIG. 8 is an illustrative flowchart depicting an example operation for determining position information for inputs detected by one or more capacitive sensors based on optical sensing information.

FIG. 8 is an illustrative flowchart depicting an example operation 800 for determining position information for inputs detected by one or more capacitive sensors based on optical sensing information. With reference, for example to FIG. 2, the operation 800 may be performed by the position estimation sub-module 226 to determine more precise and/or accurate position information for inputs detected in the sensing region 210 by the capacitive sensors 212 based, at least in part, on optical sensing information received from the optical sensors 214.

The position estimation sub-module 226 may detect an input in the sensing region of an input device based on capacitive sensing information received from one or more sensor electrodes (810). For example, the capacitive sensing information may reflect changes in the capacitance of one or more sensor electrodes coupled to the sensing region 210. The changes in capacitance may correspond to input objects detected in, or proximate to, the sensing region 210. In some embodiments, a processing system associated with the input device 200 may execute the position estimation sub-module 226 when the processing system is unsure whether the detected input corresponds to an actual user input or a ghost touch. In other embodiments, the processing system may execute the position estimation sub-module 226 when the processing system is unsure of a location, size, shape, orientation, or any other property of the detected input.

The position estimation sub-module 226 may further acquire optical sensing information from one or more optical sensors coupled to the sensing region (820). For example, the optical sensing information may correspond to an image of the sensing region 210 (or at least a portion of the sensing region 210 coinciding with the detected input). In some embodiments, the optical sensors 214 may generate the optical sensing information in response to input objects detected in, or proximate to, the sensing region 210 (such as for fingerprint scanning applications). In other embodiments, the position estimation sub-module 226 may activate or trigger the optical sensors 214 to acquire the optical sensing information in response to the detection of an input object by the capacitive sensors 212 and/or a sensor calibration event.

The position estimation sub-module 226 may then determine position information for an object detected in the sensing region based, at least in part, on the optical sensing information (830). In some aspects, the optical sensing information may correspond to a high resolution image of the sensing region 210 (or at least a portion thereof). Thus, the optical sensors 214 may detect objects in the sensing region 210 at a much higher resolution than the capacitive sensors 212. In some embodiments, the position estimation sub-module 226 may use the optical sensing information to determine more precise and/or accurate position information for an object associated with the input detected by the capacitive sensors 212.

Finally, the position estimation sub-module 226 may correlate the detected input with the position information from the optical sensors (840). As described above, the position estimation sub-module 226 may use the optical sensing information to track or detect inputs in the sensing region 210 with a much finer granularity than would otherwise be possible based on the capacitive sensing information alone. In some embodiments, the position estimation sub-module 226 may use the optical sensing information to supplement or update position estimates determined based on the capacitive sensing information (845). For example, the position estimation sub-module 226 may fold the position information from the optical sensors 214 into a running estimate of the position information for a detected input.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An input device comprising:
a plurality of sensor electrodes configured for capacitive sensing in a sensing region of the input device; and
a processing system configured to:
receive first sensor information about the sensing region from the plurality of sensor electrodes;
determine whether the first sensor information indicates an error condition;
activate one or more optical sensors to capture an image of the sensing region in response to determining that the first sensor information indicates the error condition, wherein the one or more optical sensors is operable in at least a first mode and a second mode; and
compare the image of the sensing region with the first sensor information to dynamically calibrate the plurality of sensor electrodes.

2. The input device of claim 1, wherein the processing system is to operate the one or more optical sensors in the second mode when acquiring the image of the sensing region, wherein the one or more optical sensors is configured for lower-resolution imaging when operating in the second mode compared to the first mode.

3. The input device of claim 1, wherein the processing system is to dynamically calibrate the plurality of sensor electrodes by:
detecting an input in the sensing region based on the first sensor information;
determining, based on the image of the sensing region, whether an object is in contact with the sensing region; and
selectively validating the detected input based on the determination.

4. The input device of claim 3, wherein the processing system is to validate the detected input if the image of the sensing region indicates that an object is in contact with the sensing region.

5. The input device of claim 3, wherein the processing system is to dynamically calibrate the plurality of sensor electrodes by further:
updating a capacitive sensing baseline for the plurality of sensor electrodes if the image of the sensing region indicates that no object is in contact with the sensing region.

6. The input device of claim 1, wherein the processing system is to dynamically calibrate the plurality of sensor electrodes by:
detecting an input in the sensing region based on the first sensor information;
determining, based on the image of the sensing region, position information based on one or more attributes for an object in contact with the sensing region; and
correlating the position information with the detected input.

7. The input device of claim 6, wherein the processing system is to correlate the position information with the detected input by:

estimating, based on the first sensor information, a position of the detected input in the sensing region; and updating the position estimate using the position information based on the one or more attributes determined from the image of the sensing region.

8. A method of operating an input device, comprising:

receiving first sensor information, about a sensing region of the input device, from a plurality of sensor electrodes configured for capacitive sensing;

determining whether the first sensor information indicates an error condition;

activating one or more optical sensors to capture an image of the sensing region in response to determining that the first sensor information indicates the error condition, wherein the one or more optical sensors is operable in at least a first mode and a second mode; and comparing the image of the sensing region with the first sensor information to dynamically calibrate the plurality of sensor electrodes.

9. The method of claim 8, wherein the method includes operating the one or more optical sensors in the second mode when acquiring the image of the sensing region, wherein the one or more optical sensors is configured for lower-resolution imaging when operating in the second mode compared to the first mode.

10. The method of claim 8, wherein the dynamically calibrating comprises:

detecting an input in the sensing region based on the first sensor information;

determining, based on the image of the sensing region, whether an object is in contact with the sensing region; and selectively validating the detected input based on the determination.

11. The method of claim 10, wherein the dynamically calibrating further comprises:

updating a capacitive sensing baseline for the plurality of sensor electrodes if the image of the sensing region indicates that no object is in contact with the sensing region.

12. The method of claim 8, wherein the dynamically calibrating comprises:

detecting an input in the sensing region based on the first sensor information;

determining, based on the image of the sensing region, position information for an object in contact with the sensing region; and correlating the position information with the detected input.

13. The method of claim 12, wherein the correlating comprises:

estimating, based on the first sensor information, a position of the detected input in the sensing region; and updating the position estimate using the position information determined from the image of the sensing region.

14. A processing system, comprising:

one or more processors; and a non-transitory processor-readable storage medium storing instructions that, when executed by the one or more processors, cause the processing system to:

receive first sensor information, about a sensing region coupled to the processing system, from a plurality of sensor electrodes configured for capacitive sensing;

determine whether the first sensor information indicates an error condition;

activate one or more optical sensors to capture an image of the sensing region in response to determining that the first sensor information indicates the error condition, wherein the one or more optical sensors is operable in at least a first mode and a second mode; and compare the image of the sensing region with the first sensor information to dynamically calibrate the plurality of sensor electrodes.

15. The processing system of claim 14, wherein execution of the instructions further causes the processing system to operate the plurality of one or more optical sensors in the second mode when acquiring the image of the sensing region, wherein the one or more optical sensors is configured for lower-resolution imaging when operating in the second mode compared to the first mode.

16. The processing system of claim 14, wherein execution of the instructions to dynamically calibrate the plurality of sensor electrodes causes the processing system to:

detect an input in the sensing region based on the first sensor information;

determine, based on the image of the sensing region, whether an object is in contact with the sensing region; and selectively validate the detected input based on the determination.

17. The processing system of claim 16, wherein execution of the instructions to dynamically calibrate the plurality of sensor electrodes causes the processing system to:

update a capacitive sensing baseline for the plurality of sensor electrodes if the image of the sensing region indicates that no object is in contact with the sensing region.

18. The processing system of claim 14, wherein execution of the instructions to dynamically calibrate the plurality of sensor electrodes causes the processing system to:

detect an input in the sensing region based on the first sensor information;

determine, based on the image of the sensing region, position information for an object in contact with the sensing region; and correlate the position information with the detected input.

19. The processing system of claim 16, wherein execution of the instructions to selectively validate the detected input based on the determination causes the processing system to:

validate the detected input if the image of the sensing region indicates that an object is in contact with the sensing region.

20. The processing system of claim 18, wherein execution of the instructions to correlate the position information with the detected input causes the processing system to:

estimate, based on the first sensor information, a position of the detected input in the sensing region; and update the position estimate using the position information determined from the image of the sensing region.

* * * * *